United States Patent [19]
Elsner et al.

[11] Patent Number: 5,149,220
[45] Date of Patent: Sep. 22, 1992

[54] FRICTIONAL RESISTANCE COUPLING

[75] Inventors: Ernst Elsner; Karl Junginger, both of Herbrechtingen, Fed. Rep. of Germany

[73] Assignee: J.M. Voith GmbH, Heidenheim, Fed. Rep. of Germany

[21] Appl. No.: 716,432

[22] Filed: Jun. 17, 1991

[51] Int. Cl.$^5$ .................................. F16D 2/04
[52] U.S. Cl. ............................. 403/5; 403/15; 403/27
[58] Field of Search ........................... 403/15, 27, 5

[56] References Cited

U.S. PATENT DOCUMENTS

| | | | |
|---|---|---|---|
| 4,040,338 | 8/1977 | Wilson et al. | 403/27 X |
| 4,105,343 | 8/1978 | Riegler et al. | 403/15 |
| 4,616,948 | 10/1986 | Jelfs | 403/5 |
| 4,923,320 | 5/1990 | Klischat | 403/15 X |

FOREIGN PATENT DOCUMENTS 3833350  4/1990  Fed. Rep. of Germany .......... 403/5

Primary Examiner—Andrew V. Kundrat
Attorney, Agent, or Firm—Caesar, Rivise, Bernstein, Cohen & Pokotilow, Ltd.

[57] ABSTRACT

A frictional resistance coupling comprises an outer part and an inner part, which are connected to each other in a pressure-tight manner and between them form an inner chamber with a conical surface and a likewise conical, axially displaceable annular piston. The annular piston is moved axially due to the supply of pressure medium, for producing a radial tension and frictional resistance between two parts, e.g., a coupling and a shaft. Serving for determining the axial position of the enclosed annular piston is an axially disposed transmitter cylinder, which is connected to a receiver cylinder in the region of the outer surface of the coupling, by way of an incompressible medium. The piston of the receiver cylinder supports an indicator, whereof the position is monitored by an external sensor. The transmitter cylinder and receiver cylinder form a hydraulic linkage, preferably with displacement translation for monitoring even small piston movements with reliable control of whether the annular piston has reached its end position. For this purpose, the sensor monitors the position of the indicator attached to the receiver piston, on the outer periphery of the coupling.

15 Claims, 1 Drawing Sheet

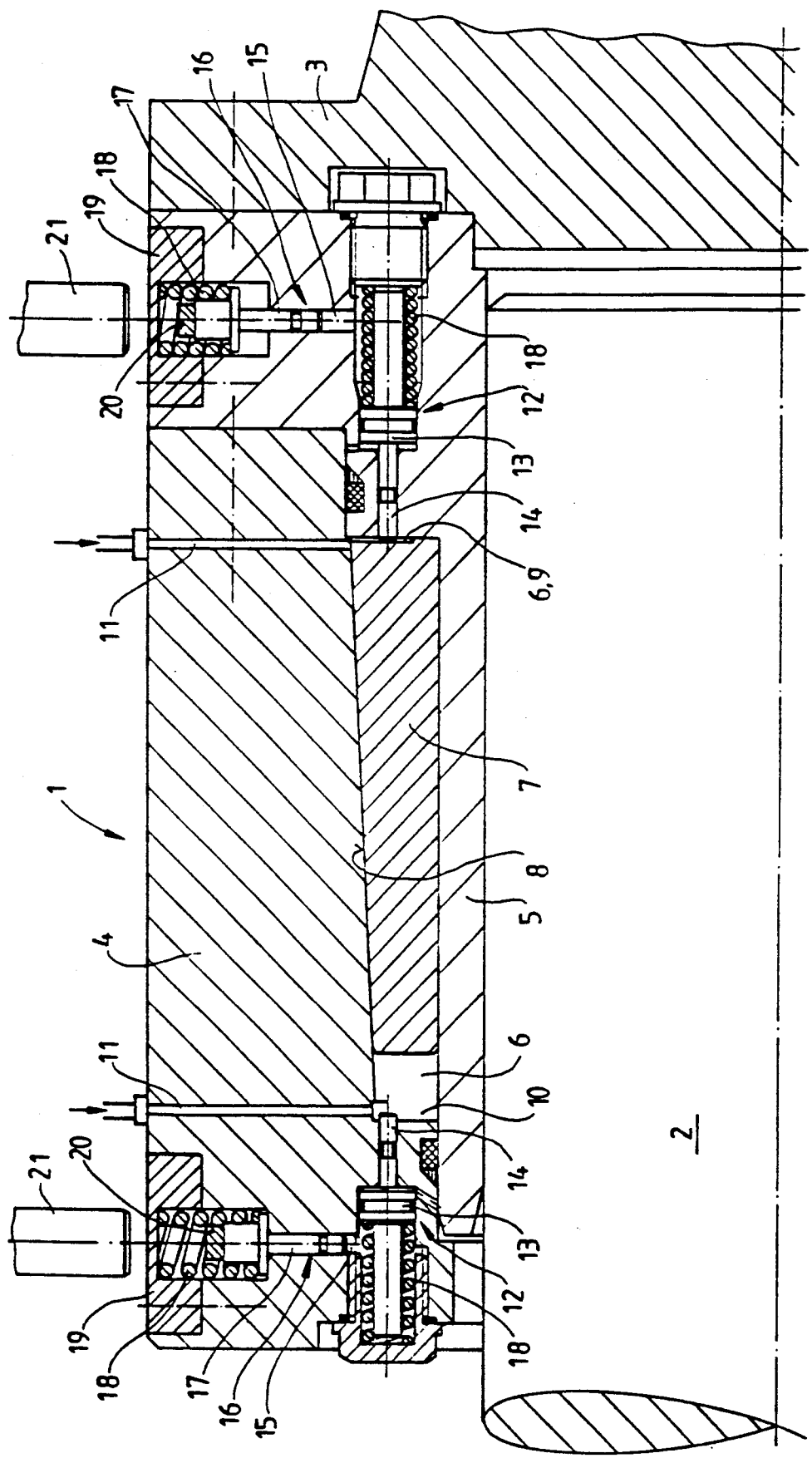

5,149,220

FRICTIONAL RESISTANCE COUPLING

BACKGROUND OF THE INVENTION

1. Field of the Invention

The invention relates to a frictional resistance coupling for the non-rotary and releasable connection of two coaxial components, for example of a hub to a shaft according to the features described in the preamble of claim 1.

2. Description of the Prior Art

A coupling of this type is known from EP-PS 0 178 300 (U.S. Pat. No. 4 616 948). The known coupling comprises an outer part and an inner part, which between them enclose an annular chamber which is conical in the axial direction and is pressure-tight. A symmetrically conical annular piston is arranged to move axially in this annular chamber. The displacement comes about due to the supply of a pressure medium to respectively one of the two end faces of the annular piston, due to which a radial clamping force is exerted for example on the shaft for the transmission of a torque by frictional resistance. The outer part of the known coupling may be constructed either for insertion in the hub of another component or as an independent component attached on its end face for example to an articulated shaft. The fit between the surfaces involved in the frictional resistance must therefore be fixed exactly. In this case, the full torque-transmission capacity between the surfaces involved in the frictional resistance, in particular on the shaft surface, is only possible if the annular piston, during its axial stroke, in conjunction with the conical wall, can produce an adequate radial tension.

The stroke of the annular piston or its position within the annular chamber cannot however be ascertained from outside. It would indeed be conceivable for example to apportion the actuating pressure in the annular chamber so that solely a pre-calculated partial stroke of the annular piston and thus a corresponding radial tension comes about. However, this is too inaccurate with regard to the coefficients of friction which cannot be monitored exactly within the frictional resistance coupling, in particular between the annular piston and the conical wall, and in view of the manufacturing tolerances and is therefore unreliable with regard to establishing the torque of the frictional resistance coupling which can be transmitted.

Therefore the frictional resistance coupling is designed so that the highest radial tension and thus the highest transmissible torque is achieved when the annular piston has completed its full stroke within the annular chamber, the maximum actuating pressure for the displacement of the annular piston always being supplied to one pressure chamber.

It would also be possible theoretically, by measuring the quantity of pressure medium supplied, to ascertain the movement or the position of the piston within the annular chamber. However, on account of leakages at the screwed couplings, the indication tolerances of the measuring device for the pressure medium and the elastic deformations of the components taking part, under high pressure, falsifying the measured value, this measuring method is also not reliable.

OBJECT OF THE INVENTION

It is the object of the invention to construct a frictional resistance coupling of the afore-described type, so that in a simple and reliable manner it is possible to ascertain the end position of the annular piston reached in the inner chamber.

SUMMARY OF THE INVENTION

The above object is achieved by an indicator guided in a movable manner within the outer part of the coupling so that it may vary its position with respect to the inner annular piston, by way of an indirect connection so that it likewise reaches its end position when the end position of the annular piston is reached. This end position of the indicator can be recognised by a sensor disposed outside the outer part. Between the stroke of the annular piston and the displacement of the indicator, at least in the end region of the piston stroke, a connection is created, which corresponds to an indication of position for the position of the annular piston in the annular chamber, which can be monitored for checking at the time of assembly. This makes a mechanical measurement which under certain circumstances is difficult, and frequently even impossible on account of restricted structural conditions as regards space, for example by means of a probe in the inner chamber or in one of the pressure chambers, dispensable.

In accordance with another feature of the invention a measuring arrangement comprising an indicator and a sensor may be associated with each pressure chamber at the end faces of the annular piston. In addition, the connection between the annular piston and the indicator may take place by means of a piston-cylinder arrangement, namely a transmitter cylinder with a corresponding transmitter piston, facing the annular piston, which is connected by way of a channel filled with imcompressible medium, to a receiver cylinder with a receiver piston. In this case the indicator is integrated with the piston of the receiver cylinder, whereas the transmitter cylinder is acted upon directly by the annular piston. A rigid connection in the manner of a hydraulic linkage is thus created between the indicator and the annular piston. According to a further feature of the invention the indicator should consist of a material which can be monitored by sensors, for which purpose in particular magnetic material is suitable. The receiver cylinder is located on the outer part with a radial axial direction, the indicator being disposed in the radially outermost region of the receiver piston and being able to be extended as far as its outermost end position, in the region of the outer periphery of the outer part. In the peripheral region of the outer part, the sensor is disposed in a stationary manner, thus not co-rotating, which sensor reacts in a non-contacting manner to the radial position of the indicator within the receiver cylinder, the sensor being able to be constructed as a proximity switch. In accordance with another feature of the invention, provided in the outer part of the coupling, in the region of the indicator or receiver cylinder is a zone which is neutral as regards sensors, in order that the sensor reliably indicates solely the position of the indicator. This neutral zone as regards sensors may be constructed as an attachment plate of non-magnetic material for the receiver piston with indicator. Whereas the direction of action of the receiver cylinder is not necessarily radial, but can also be arranged axially for example, the transmitter cylinder is preferably provided with an axial operating direction in the region of the pressure chambers. Due to this, the axial stroke of the annular piston can be monitored directly, the transmitter piston being connected to the annular piston by way of an elongated push rod, as soon as the annular piston has moved close enough to its end position. In this case, on reaching the end position of the annular piston, the push rod is inserted entirely in the end face of the pressure chamber and the receiver piston with the indicator should in this case likewise have reached its end position for monitoring by the sensor. In accordance with another feature of this invention the transmitter cylinder has a greater diameter than the receiver cylinder, a surface ratio of the order of magnitude of 1:8 being possible, which corresponds to a displacement translation with the same amount between the transmitter piston and the receiver piston. A stroke of approximately 1 to 3 mm is provided for the transmitter piston, preferably between 1 and 1.5 mm. Thus the receiver piston with the indicator may complete a stroke of approximately 10 mm. Due to this displacement translation, a sensitive monitoring of the stroke movement of the annular piston and thus a measurement of the end position with high accuracy is created. The push rod projecting into the inner chamber in the region of the pressure chamber thus comes into contact with the annular piston for the first time when the latter has approached its end position apart from the last 1 to 3 mm.

According to a further feature of the invention the push rod is sealed by a seal with respect to the high pressure prevailing in the pressure chamber, likewise the transmitter and receiver pistons with respect to the outer region. pressure relief leading into the atmosphere may be provide between the seal of the push rod and the transmitted piston. At least one of the transmitter or receiver cylinders comprises a return spring for the corresponding piston, in order that the piston-cylinder arrangement once more reaches its initial position for the next working cycle.

BRIEF DESCRIPTION OF THE DRAWING

The invention will be described in detail hereafter with reference to the drawing showing one embodiment.

DESCRIPTION OF THE PREFERRED EMBODIMENT

A frictional resistance coupling 1 is illustrated in a longitudinal section, which coupling connects a shaft 2 to an articulated shaft flange 3. The frictional resistance coupling 1 thus represents an independent component with an outer part 4, which is connected to an inner part 5 in a pressure-tight manner and comprises a conical, inner surface 8. The outer part 4 and the inner part 5 enclose between them a pressure-tight inner chamber 6, in which an annular piston 7 having a conical outer surface is provided, which corresponds to the conicity of the wall 8. Formed on the two end faces of the axially displaceable annular piston 7 are pressure chambers 9, 10, which can be supplied alternately with pressure medium in each case from outside by way of channels 11. Due to this the annular piston can be moved in each case into one of the two end positions. The drawing shows the end position of the annular piston 7, in which the frictional resistance coupling is relieved of pressure and thus can be detached from the shaft 2. When pressure medium is supplied through the channel 11 to the pressure chamber 9, the annular piston 7 is moved towards the pressure chamber 10 not supplied with pressure medium and thus produces a radial clamping force between the outer part 4 and the inner part 5 for the frictional resistance transmission of torque between the shaft 2 and the flange 3.

Respectively located at the front end of the two pressure chambers 9, 10 is a transmitter cylinder 12 whereof the axial direction is parallel to the axis of rotation of the coupling. Located within the transmitter cylinder 12 is a transmitter piston 13 with a push rod 14, which is directed towards the end face of the respective pressure chamber or of the annular piston. In the present embodiment, the outer part 4 or the inner part 5 is constructed so that in each case one of the transmitter cylinders 12 is located on the outer part 4, namely the transmitter cylinder associated with the pressure chamber 10, whereas the transmitter cylinder associated with the pressure chamber 9 is located on the inner part 5. Respectively associated with the corresponding transmitter cylinder 12, on the outer part 4 or inner part 5, with a radial axial direction, is a receiver cylinder 16, arranged with a piston 17. These transmitter or receiver cylinders 12, 16 arranged on the outer part 4 or inner part 5 are connected to each other by way of a connecting channel 15 and a filling of incompressible medium. An indicator 20 is located on the piston 17 of the respective receiver cylinder 16 radially outwards towards the outer periphery of the frictional resistance coupling. This indicator 20 consists of a material which can be monitored by sensors, for example a magnetic metal. A return spring 18 is located behind each of the pistons 13 and 17 of the transmitter and receiver cylinders 12, 16. The piston 17 and the spring 18 of the receiver cylinder 16 are attached by an attachment plate 19 to the outer periphery of the coupling. This attachment plate 19 preferably consists of a material which is neutral with regard to sensors. A sensor 21 is located in the region of the receiver cylinder 16. This sensor 21 is attached outside the coupling, thus does not co-rotate, and is preferably constructed as a proximity switch, due to which it may monitor the spacing of the indicator 20 in a non-contacting manner at a short distance from the surface of the coupling.

In the embodiment illustrated it can be seen that in its relieved position, the annular piston 7 has displaced the push rod 14 of the piston 13 completely inwards within the transmitter cylinder 12 associated with the pressure chamber 9. The piston 13 has displaced through the channel 15 the pressure medium contained, into the receiver cylinder 16, so that the piston 17 has moved radially outwards with the indicator 20 attached thereto. Due to this the indicator 20 came into the vicinity which can be monitored by the sensor 21, so that the latter is able to indicate that the end position of the annular piston 7 has been reached. On the other hand, if high pressure medium is supplied through the channel 11 to the pressure chamber 9, the pressure chamber 10 being relieved of pressure, then the annular piston 7 moves towards the left into the position in which a radial tension is produced between the outer part 4 and the inner part 5 for forming a frictional resistance on the surface of the shaft 2. Shortly before reaching the left-hand end position within the relieved pressure chamber 10, the push rod 14 of the transmitter piston 13 at that point is pushed in in the transmitter cylinder 12 so that once more the piston 17 of the receiver cylinder 16 is moved radially outwards with the other indicator 20 for monitoring by the other sensor 21, similar to the monitoring of the position of the annular piston in the pressure chamber 9.

It is sufficient if the push rod 14 projects only a few millimetres into the respective pressure chamber and thus monitors only the end region of the stroke of the annular piston 7. A displacement translation between the piston 13 of the transmitter cylinder 12 and the piston 17 of the receiver cylinder 16 is an advantage. For this purpose, the effective piston surface of the piston 13 is at least five times greater than the piston surface of the piston 17 in the receiver cylinder 16. A surface ratio of approximately 1:8 has proved successful. This has the advantage that on the one hand even small movements of the annular piston 7 are still monitored, whereas on the other hand a sufficiently large stroke of the piston 17 in the receiver cylinder 16 comes about and thus reliable monitoring of the radial position of the indicator 20 or of the axial position of the annular piston 7 by means of the sensor 21. The construction of the attachment plates 19 on the receiver cylinder 16 from a material which is neutral as regards the sensor, has the advantage that the sensor reliably monitors only the vicinity of the indicator 20. During the assembly, for one working cycle for the annular piston 7, thus a stroke movement in one or other sliding direction, only a single sensor is simultaneously necessary. Thus, in each case the same sensor can be used for scanning the indicator 20 for the pressure chamber 9 or for the pressure chamber 10. For a remote actuation of the assembly, it may also be necessary to use two sensors 21 for simplification, which are placed on the coupling jointly in a retaining device (not shown).

We claim:

1. A frictional resistance coupling for the non-rotary and releasable connection of two coaxial components, said coupling comprising:
   (a) an outer part facing one of said two coaxial components and an inner part facing the other of said two coaxial components, said outer and inner parts including surfaces forming an annular chamber which extends axially, and which, in said axial direction, is conical in shape;
   (b) a conical, annular piston located within said annular chamber, said piston including surfaces in sealing engagement with axially extending surfaces of the annular chamber, said annular piston being axially movable in the annular chamber and having end faces at opposite axial ends, said end faces cooperating with surfaces of said annular chamber adjacent thereto form two pressure chambers within said annular chamber;
   (c) a passage means communicating with each of said pressure chambers for receiving a supply of a pressurizing medium which can be supplied from a high pressure source into respectively one of the two pressure chambers;

characterised by the combination of the following further features:
   (d) the outer part (4) comprises at least one movably guided indicator (20) therein;
   (e) the annular piston (7) communicating with the indicator (20) for moving the indicator to a predetermined position upon movement of the annular piston (7) to an end position within one of the pressure chambers (9, 10); and
   (f) a sensor means (21) disposed adjacent the outer part for sensing when the indicator is in said predetermined position.

2. The coupling according to claim 1, characterised in that a movably guided indicator (20) communicates with each pressure chamber (9, 10), each of said indicators being movable to a predetermined position upon movement of the annular piston to an end position within the pressure chamber communicating with said indicator, and a sensor means for sensing when each of said indicators is in said predetermined position.

3. The coupling according to one of claims 1 or 2, characterised in that communication between the annular piston (7) and each indicator (20) is through a piston-cylinder combination comprising a transmitter cylinder (12) having a transmitter piston (13 movable therein, said transmitter piston facing and communicating with the annular piston (7), and a receiver cylinder (16) having a receiver piston (17) movable therein, and a connecting channel (15) communicating with said transmitter and receiver cylinders, said connecting channel including an incompressible fluid therein.

4. The coupling according to claim 3, characterized in that each indicator (20) is attached for movement with the receiver piston (17) of the receiver cylinder (16).

5. The coupling according to claim 4, characterised in that each indicator (20) attached for movement with the receiver piston (17) comprises a magnetic material which can be monitored by the sensor.

6. The coupling according to claim 4 characterised in that the receiver cylinder (16) in the outer part (4) includes a radially extending central axis and the indicator (20) being located on the receiver piston (17) within the receiver cylinder (16) in the outer part in a position facing the outer periphery of the outer part (40), said receiver piston (17) within the receiving cylinder (16) in the outer part (4) being in a radially outermost position when the annular piston (7) is in an end position in one of the pressure chambers (9, 10).

7. The coupling according to claim 1, characterised in that the sensor means (21) is arranged in a stationary, non-co-rotating and non-contacting manner adjacent the peripheral region of the outer part (4) and is a proximity switch reacting to the position of the indicator (20).

8. The coupling according to claim 3, characterised by the inclusion of an attachment plate (19) formed of a material which is neutral with regard to the sensor, said attachment plate being secured to the outer part (4) in the region around the receiver cylinder (16).

9. The coupling according to claim 3, characterised in that the annular chamber includes end faces at opposed axial ends thereof, each transmitter cylinder (12) extending axially from, and communicating with an end face of said annular pressure chamber (9, 10), each transmitter piston (13) including a push rod (14) and being axially displaceable within its corresponding transmitter cylinder (12), each transmitter piston (13) being displaced axially through the push rod (14) thereof when the annular piston (7) is adjacent the transmitter piston (13) being displaced, at an end region of a stroke of said annular piston (7).

10. The coupling according to claim 9, characterised in that indicator (20) is on receiver piston (17), and, in the end region of the stroke of the annular piston (7) in the pressure chamber (9, 10), the push rod (14) is pushed completely into the end face of the pressure chamber (9, 10) and, the receiver piston (17) within the receiver cylinder (16) having reached a position at which the indicator (20) is in said predetermined position.

11. The coupling according to claim 3, characterised in that the transmitter cylinder (12) has a greater diameter than the receiver cylinder (16).

12. The coupling according to claim 11, characterised in that the effective surface of the transmitter piston (13) in the transmitter cylinder (12) is eight times as great as the effective surface of the receiver piston (17) in the receiver cylinder (16).

13. The coupling according to claim 12, characterised in that the stroke of the transmitter piston (13) in the transmitter cylinder (12) is in the range between 1 and 3 mm.

14. The coupling according to claim 13, characterised by seal means for sealing an inner chamber of the transmitter cylinder (12) from high pressure prevailing in the pressure chamber (9, 10).

15. A coupling according to claim 3, characterised in that a return spring cooperating with at least one of said transmitter and receiver pistons (13, 17) is provided for biasing at least one of said transmitter and receiver pistons in a direction opposed to the direction of movement for establishing the frictional resistance connection between the two coaxial components.

* * * * *